Aug. 27, 1957     J. S. SWEARINGEN     2,804,021
APPARATUS FOR EXTRACTING ENERGY FROM GAS
Original Filed Sept. 29, 1949     2 Sheets-Sheet 1
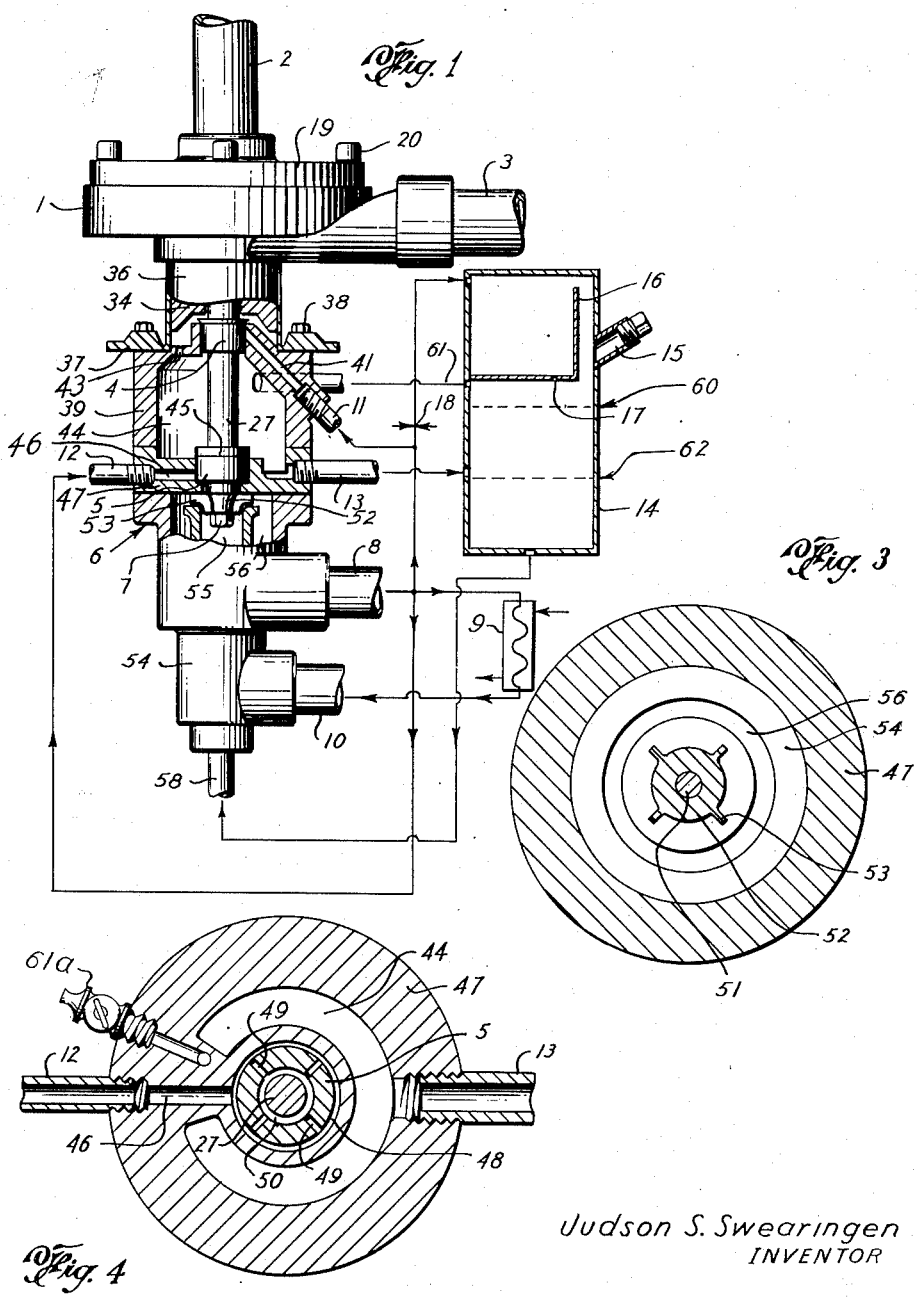
Judson S. Swearingen
INVENTOR
BY
ATTORNEYS

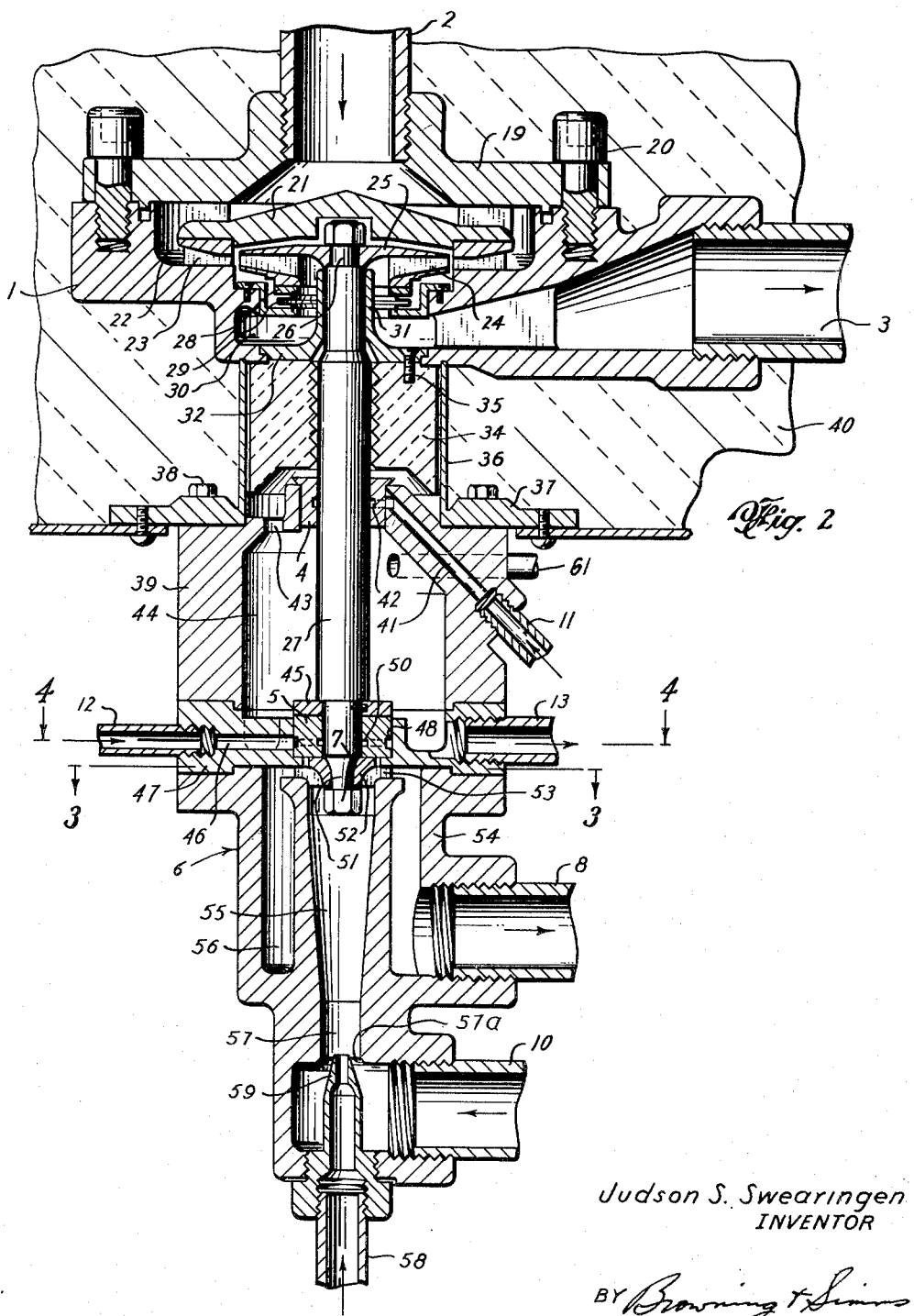

United States Patent Office 2,804,021

Patented Aug. 27, 1957

1

2,804,021
APPARATUS FOR EXTRACTING ENERGY FROM GAS

Judson S. Swearingen, San Antonio, Tex., assignor to Air Products Incorporated, a corporation of Michigan Continuation of abandoned application Serial No. 118,658, September 29, 1949. This application June 27, 1955, Serial No. 518,214

17 Claims. (Cl. 103—87)

This invention relates to apparatus for extracting energy from gas and has for its general object the provision of such an apparatus which will be capable not only of extracting the energy from the gas but also of dissipating the energy extracted without permitting any substantial portion thereof to be again taken up by the gas, and without loss of gas.

It is well known that when a gas is under compression and is permitted to expand, it gives off energy. If, however, it is permitted to expand through an orifice, the energy given off is converted into heat much of which is again taken up by the expanded gas. In order to avoid this reabsorption of the heat energy by the gas, attempts have been made to cause the gas in expanding to do mechanical work and to transmit this mechanical work by mechanical means to some point remote from the expanded gas and to there reconvert it into heat, so that the expanded gas will not have an opportunity to reabsorb the heat energy. This expedient can be operated with reasonable success under some circumstances, but under those circumstances in which relatively small volumes of gas are being handled and are being handled at pressures differing substantially from atmospheric pressures, the matter of transmitting the mechanical energy from the turbine or other expansion engine in which the expanding gas does mechanical work, out of the body of expanded gas and to a remote point where it is dissipated, has been found to involve the loss of portions of gas due to leakage about the mechanical transmission means, both expense and difficulty in the mechanical conversion or absorption of the mechanical energy at the very high speeds of rotation of these small machines, and also additional expense and trouble with a suitable lubrication system for the high-speed bearings.

This invention has for one of its objects the provision of an apparatus whereby mechanical energy obtained from the expansion of gas may be transmitted from the point where it is produced to another point remote from the body of expanded gas without the loss of gas due to leakage and without the loss of substantial mechanical energy due to packing friction.

This object is attained by providing a combined bearing and pressure lubricant seal about a shaft or other mechanical work transmitting element which transmits the mechanical energy from the zone adjacent the expanded gas from which it is produced to a remote point where it is dissipated by means of a pump driven by the shaft to pump a liquid through a restricted opening and a cooler, the liquid so pumped being a lubricant and being also utilized for the purpose of providing lubricant under pressure to the bearing and seal above mentioned.

Another object is to provide such a system in which the discharge pressure of the turbine substantially exceeds the inlet pressure required by the pump.

Another object is to provide such an apparatus wherein the power-absorbing means is completely enclosed so that the problem of preventing leakage around the shaft is not affected by the pressure levels in the turbine.

Still another object is to provide such an apparatus which is loaded by a centrifugal pump, advantages of which are simplicity and small size and also the characteristic of speed variation with load in a manner favoring high efficiency operation of the turbine at various (turbine) inlet pressures.

Another object is to provide an arrangement whereby the pressure at the inlet to the centrifugal loading pump can be raised a substantial amount above the pressure communicated around the shaft from the turbine. An elevated inlet pressure is required for satisfactory operation of a high speed centrifugal pump to suppress cavitation.

Still another object is to provide such an apparatus with a self-contained lubrication system, the load-pump fluid being the lubricant and the pump supplying it under pressure.

Yet another object of my invention is to provide such an apparatus in which the oil level at start is higher than during normal operation, for the purpose of assuring the presence of oil in the pump and thrust bearing at start-up.

Another object is to provide such an apparatus whereby energy is obtained from the expansion of gas and removed therefrom, which apparatus is simple and has few moving parts.

Other objects and advantages of this invention will become apparent from the following description taken in connection with the accompanying drawings in which are set forth by way of example and illustration one embodiment of the invention.

In the drawings:

Fig. 1 is a view partly in side elevation, partly in cross-section and partly in diagrammatic form illustrating an apparatus constructed in accordance with this invention.

Fig. 2 is a longitudinal cross-section through the turbine, bearings and lubricant pump illustrated in Fig. 1, the same being on an enlarged scale.

Fig. 3 is a transverse cross-section taken along the line 3—3 of Fig. 2 and showing the lubricant pump.

Fig. 4 is a transverse cross-section taken along the line 4—4 of Fig. 2 and showing the bearing and pressure lubricant seal.

Referring now more in detail to the drawings, the expansion engine which in this instance is in the form of a gas turbine having a gas inlet 2 and a gas outlet 3 has its rotor carried on a vertical shaft which passes downwardly through a radial bearing 4 and rests upon a thrust bearing 5 below the radial bearing. The expansion engine is enclosed by a housing, which may consist of a main turbine housing 1, a cover plate 19, a depending wall sleeve 36, a bearing support housing 39, a thrust bearing support 47 and a thrust bearing 5. This thrust bearing 5, as hereinafter explained in more detail, provides the seal for preventing escape of expanded gas from the turbine without excessive packing friction and may be considered a part of the enclosing housing as the shaft 27 may be journaled directly in thrust bearing support 47 eliminating thrust bearing 5 as a separate member without sacrificing its function as a seal.

The lower end of the turbine shaft is connected to a pump generally designated at 6 and adapted to pump a liquid which may be used as a lubricant, the rotor of this pump being held in place on the end of the shaft by means of a nut 7 or the like. The pump is adapted to discharge a liquid under pressure through its outlet 8, circulate it through a cooler 9 of any suitable design, and take the cooled liquid back in through the pump inlet 10.

Part of the liquid under pressure from the pump outlet 8 may be supplied to the bearing connection 11 leading to an intermediate point on the radial bearing 4. Another connection is provided whereby part of this liquid under pressure from the outlet 8 may be supplied to the bearing connection 12 leading to an intermediate point of the thrust bearing 5. Lubricant forced through these two bearings, which, due to the design of the pump 6, is forced into the bearings under pressure greater than that of the gas communicated from the turbine, will be collected and drawn off through the drain connection 13 and into a reservoir 14, in which the pressure during operation will be that of the expanded gas in the turbine. The function of this reservoir 14 in the combination will be presently set forth. This reservoir 14 will be filled initially to a desired level through the plugged filler opening 15, and within the upper end of this reservoir is provided a receptacle 16 which during operation will be caused to overflow continuously into the lower end of the reservoir and which is provided with a small leak or opening 17 in or adjacent its lower end for draining it when operation ceases. A connection is provided between the outlet 8 of the pump 6 and the receptacle 16 in the reservoir 14 through a throttle valve or choke 18 so that the lubricant will be constantly supplied in a small quantity to the upper end of the reservoir 14 from the outlet of the pump 8, this quantity being greater than that which can leak through the opening 17. In order to return liquid from the reservoir to the pump in those cases in which the pressure of the expanded gas is less than the required inlet pressure of the pump, an ejector arrangement is provided as hereinafter more fully described.

Referring to the structure of the turbine, bearings, and pump assembly in still greater detail, it is noted that the main turbine housing is provided with an upper cover plate 19 through the center of which enters the turbine inlet 2. This plate 19 is secured to the main housing by means of cap screws 20 or other suitable devices and is sealed to the main turbine housing in any conventional manner. Upon entering the main turbine housing, gas from inlet 2 is caused to flow laterally in all directions by the stationary deflector 21, until it reaches the annular space 22 when it is caused to reverse its direction of flow and flow tangentially and radially inwardly toward the center of the housing 1 through the stationary nozzles 23 in which it is subjected to some expansion and its velocity increased. Emerging from these nozzles 23, the gas is conducted into the space between the blades 24 on the turbine rotor 25, and in passing between these blades toward the axis of the rotor, it is further expanded and its velocity decreased as it produces mechanical energy. The rotor 25 is mounted on the reduced upper end 26 of the vertical shaft 27 which has previously been referred to, as passing through the bearings 4 and 5. A suitable seal is provided between the housing 1 and the rotor 25 to separate the intermediate pressure annular zone surrounding the turbine wheel from the low pressure zone at the turbine wheel discharge, the seal illustrated being a carbon ring 28 carried on a flexible metallic bellows 29.

Gas, on emerging from the rotor blades 24 adjacent the hub of the rotor, is collected in the annular low pressure space 30 within the housing 1 and is conducted therefrom to the turbine outlet 3.

The shaft 27 immediately below the rotor passes through a close fitting sleeve 31 disposed entirely within the housing 1 and carried on a plate 32 which serves to close the opening in the housing 1 through which the shaft 27 passes. The sleeve 31, it will be understood, is not in tight frictional engagement with the shaft 27 but embraces the same with a close tolerance. This clearance is made even closer at sub-zero temperatures by congealed oil which may accumulate therein, and such accumulation acts to improve the seal, to impede oil flowing up the shaft into the turbine, and to impede breathing into and out of the closed space 44 due to fluctuations in turbine pressure.

Outside of the plate 32 and the housing 1, there is a block 34 of a suitable thermal insulating material of substantial strength which may be of a substance commonly known as "micarta." This block likewise closely embraces shaft 27 without frictional engagement and is held in place by one or more screws 35 passing through the plate 32. A thin wall sleeve 36, preferably of metal, is fixedly secured to and depends from the turbine housing and terminates in a lateral flange 37 at its lower end. This flange in turn is secured by means of studs 38 or the like to the bearing support housing 39 and serves to support that housing. It will be seen that the insulating block 34 will serve to provide thermal insulation between the portion of the turbine housing 1 conducting the gas on the one hand, and the bearing support housing 39 on the other hand. The sleeve 36, being of thin walls, will not serve to transmit much heat between these parts, but by virtue of its being made integral with the outer wall of the turbine housing and of its being secured in sealing engagement with the upper end of the bearing support housing, it serves to sustain the pressure differential existing between the expanded gases and atmospheric pressure.

With the purpose of still further insulating the turbine housing so as to prevent the absorption of heat energy by the gases contained therein, the entire turbine housing is preferably enclosed within a mass of suitable thermal insulating material 40.

The radial bearing 4, which is carried by the upper end portion of the bearing support housing 39, and which surrounds the shaft 27, is supplied with lubricant under pressure through the connection 11 above mentioned and through a passageway 41 formed in the body of the bearing support housing 39. This lubricant passes into a groove 42 intermediate the ends of the bearing 4, and being under a pressure greater than the pressure of the expanded gases within the turbine housing, which pressure also exists within the sleeve 36 and the bearing support housing 39, this lubricant will flow in both directions from the groove 42 between the bearing 4 and the shaft 27 and provide adequate pressure lubrication for this radial bearing. Lubricant flowing upwardly along the shaft from this bearing will pass down into the space 44 in the bearing support housing 39 through the opening 43 provided for this purpose while lubricant flowing downwardly along the shaft from this bearing will pass directly into the hollow space 44 within the bearing support housing 39.

Within the lower end of the hollow space 44, the shaft 27 is provided with a reduced section forming a shoulder against which is received a thrust bearing collar 45 held in place on the shaft by a set screw or the like. This thrust collar bears against the upper surface of the thrust bearing member 5.

The thrust bearing member 5 is supplied with lubricant under pressure through the connection 12 and the passageway 46 provided in the thrust bearing support 47. This passage 46 leads to an external groove 48 in the bearing member 5, which, in turn, connects with radial passages 49 through this bearing member and with an internal groove 50 in the bearing member 5 intermediate its ends.

Below the bearing member 5, the shaft 27 is still further reduced at 51 to receive the hub 52 of a pump rotor which carries impeller blades 53. This rotor is held in place on the shaft by a nut or other suitable means.

It will be seen that lubricant passing from the groove 50 upwardly between the bearing 5 and the shaft will flow into the space 44 within the bearing support housing 39 and the lubricant flowing downwardly from this groove 50 will flow between the impeller blades 53 and join the stream of lubricant being pumped by this rotor.

The lubricant from the connection 12, being of higher pressure than the gas whose pressure determines the pressure in chamber 44, will flow upwardly along the shaft and between the shaft and the bearing 5 and will thereby prevent leakage of the expanded gas from the space 44 downwardly through the bearing 5. The lower end of the space 44 forms a sump for collecting lubricant from the bearings 4 and 5 and the lubricant thus draining from the respective bearings into the space 44 will be drawn off from this sump through the connection 13 in the manner hereinafter described.

Secured to the lower face of the thrust bearing support 47 is a pump housing 54 having an axial intake passage 55 leading upwardly in substantial alignment with the shaft 27 and connected with the spaces between the impeller blades 53 close to the shaft. Surrounding the passageway 55 is an annular pump discharge passageway 56 connected at its upper end with the discharge ends of the impeller blades 53 and connected at its lower end with the pump discharge connection 8.

It will be appreciated that if the pressure of the gas in chamber 44 is greater than the inlet pressure of the pump, the lower end of the reservoir 14 may be connected directly to the pump inlet and the gas pressure will cause flow from the reservoir into the pump. However, it is well known that high speed pumps require supercharging to avoid cavitation and if the inlet pressure required by the pump is greater than that of the expanded gas, such a simple return cannot be employed. To accomplish this return the following provision is made:

Lubricant drawn in through the inlet 10 and passing through the passageway 55 on its way to the pump rotor is caused to flow through the restriction 57 having a reduced overall cross section. A connection from the exterior of the pump housing is provided at 58 leading to a suction tip 59 located within the entrance to restriction 57 and providing an annular nozzle 57a having at its outlet a zone of greatly reduced pressure which is also at the open end of the suction tip. Thus, when lubricant is being caused to flow through the inlet 10 and the restriction 57, it will induce flow from the connection 58, which is in turn connected to the reservoir 14.

Thus by virtue of this connection 58 the pressure in the oil reservoir, which is fixed by pressures in the turbine, is communicated to the reduced pressure zone at the outlet of annular nozzle 57a. The oil at high velocity at 57a flows through the equalizing passage 57 wherein the two streams, one the circulating oil from the annular nozzle 57a and the other from the suction tip 59, become intermingled as to relative velocity. This mixing, while passing through a passage of constant cross section, causes some overall deacceleration and consequent increase in pressure. The stream then passes into the tapered passage 55 of gradually increasing cross section which further reduces the velocity of the stream and correspondingly increases its pressure. The stream from this tapered passage 55 enters the suction of the pump wheel. Thus a pressure prevails at the pump wheel suction which is much higher than that prevailing at the reduced pressure zone at the outlet of annular nozzle 57a which by virtue of the connection 58 is substantially the same as that in the oil reservoir.

While the ejector is not indispensable in cases in which the pressure at the bearings is higher than the inlet pressure required by the pump, it is still of value in such cases. This value results from the fact that the oil at the bearings becomes saturated with gas and the pressure at the bearings is the bubble point of the oil leaving the bearings. If such oil is then subjected to a lower pressure it will liberate gas. Inasmuch as oil is being constantly removed from the pump circulating system and forced through the bearings and then returned after being saturated with gas or air at the bearings, the condition of the oil in the circulating system will approach that of the oil from the bearings and will have a high bubble point pressure. The use of the ejector makes possible the avoidance of a pump inlet pressure lower than the pressure prevailing at the bearings and hence avoids release of air or gas from the oil at a point where it might collect in the pump and cause gas locking. The importance of this is in direct proportion to the solubility in the lubricant of the gas expanded in the turbine.

In operation, the gas expanding and passing through the turbine, as above described, will be discharged through the turbine outlet 3, and after its expansion will be well insulated from taking up external heat by means of the body of insulation 40 and the insulating block 34. However, due to the fact that no complete seal is provided about the shaft 27 above the bearing 5, the pressure of the expanded gas will exist within the sleeve 36 and the bearing support housing 39.

The lubricant system illustrated more or less diagrammatically in Fig. 1 will be initially filled through opening 15 until the level in reservoir 14 is at a point in the neighborhood of that indicated by the arrow 60, after which the system will be closed. When the system is so filled, the lubricant will be at a level both in the reservoir 14 and in the bearing support housing 39 corresponding to that indicated by the arrow 60. The small container 16 at the upper end of the reservoir 14 will be empty. Provision is made for equalization of pressures in the upper end of the space 44 and in the upper end of the reservoir 14 by means of a suitable vent connection 61. The purpose of providing for the high, nonoperating level at 60 is to provide a hydrostatic head in the system sufficient to permit air or gas to be bled off from the upper end of the pump chamber 56 through the cock 61a before starting.

After bleeding the space at the upper end of chamber 56, the apparatus may be started, whereupon lubricant will be moved by the pump so as to flow under pressure from the pump outlet 8 and through the cooler 9, in which its heat energy is extracted, and back into the pump through the pump inlet 10. At the same time, lubricant under pressure (which by virtue of the pump design is greater than the pressure of the expanded gas within the chamber 44) will be caused to flow into the bearings 4 and 5 and from these bearings upwardly and downwardly along the shaft 27 in the manner hereinbefore described. Also, this high pressure fluid will be caused to flow through the choke 18 and into the upper end of the reservoir 14 which will be at the same pressure as the inside of the chamber 44 because of the vent line 61 above referred to. The choke 18 should be of such diameter that flow will take place therethrough at a rate greater than that at which the lubricant will drain out of the receptacle 16 through the opening 17, so that this receptacle 16 will shortly become full and overflow. This will lower the level in the lower part of the reservoir to the point 62 and insure that space 44 will be kept drained of any lubricant which would otherwise be beaten into a froth by the rapidly rotating shaft 27. This overflowing condition should be maintained throughout the operation of the device.

The lubricant flowing from the pump through the two bearings and through the choke 18 into the reservoir 14 will be returned to the pump through the ejector 59, this ejector being designed to produce a pressure at the outlet of the suction tip 59 sufficiently low to cause lubricant to flow from the lower end of the reservoir 14 into the pump inlet passage 55 while pressure in passage 55 is maintained high enough to avoid cavitation in the pump.

Upon shut down of operation, lubricant will drain from receptacle 16 through port 17, raising the level again to point 60 to make possible the bleeding of the pump chamber 56 before again starting the turbine.

Since the lubricant circulation system, including the pump, the cooler, the bearings, the chamber 44 and the reservoir 14, is a completely closed system subjected only to the pressure of the expanded gas, and completely encloses the lower end of the shaft 27, it will not permit the escape of any expanded gas. On the other hand, it will serve as a mechanical energy absorber to convert the mechanical energy transmitted by the shaft into heat energy in the lubricant and to dissipate the same in the circulation of the lubricant through the cooler without opportunity for the heat energy to be reabsorbed by the gas. The mechanical energy transmitted by the shaft may be converted into heat energy in the lubricant upon the lubricant flowing through the restricted opening formed by the restriction 57, or upon the lubricant flowing through any suitable fluid flow restriction means located in the pump circuit including the cooler 9. No packing involving substantial frictional resistance is necessary and the expanded gas is protected in every way against reabsorption of energy.

It will be understood that the lubricant system need not necessarily enclose the lower end of the shaft 27, it being sufficient if this system include a bearing or closely embracing freely fitting part surrounding this shaft so arranged that the bearing or embracing part will be supplied with a lubricant under pressure greater than the pressure of the expanded gas, and that means be provided for withdrawing the lubricant flowing from this bearing or embracing part into the area occupied by the expanded gas without permitting the escape of expanded gas. Furthermore, an expansion engine other than a turbine and a pump other than a centrifugal pump may be used, and for the rotating shaft there may be substituted some other mechanical work transmitting element.

From the foregoing, it will be seen that an arrangement has been provided whereby a gas may be expanded to remove energy therefrom, the energy removed, transported to a remote point and dissipated to avoid reabsorption of the energy by the gas, and the moving parts of the device lubricated and sealed to prevent the escape of gas without the generation of excessive heat energy adjacent to the gas.

All of the other objects and advantages sought by this invention are likewise accomplished by the means set forth, but it will be understood that the particular embodiment shown and described is by way of illustration and example only and is not to be taken by way of limitation.

This application is a continuation of application Serial No. 118,658, filed September 29, 1949, now abandoned.

The invention having been disclosed, what is claimed is:

1. In combination, a gas expansion engine, a lubricant pump adapted to discharge lubricant at a pressure higher than the pressure of the gas at a selected point in said engine, mechanical means including a shaft exposed to the pressure of the gas at the selected point in said engine and connecting said engine and pump whereby said engine drives said pump, a housing enclosing said engine and a portion of said shaft and having a portion closely but freely embracing a zone of said shaft, a connection between said pump and a point intermediate the ends of said zone to cause lubricant to flow between said portion of said housing and said shaft toward said engine along said shaft to prevent flow of gas through said zone, means for collecting such lubricant and returning it to the inlet of said pump, means for absorbing energy from lubricant discharged from said pump, and means connecting said pump and energy absorbing means for circulating lubricant from the pump to the energy absorbing means and thence back to the pump, said pump and energy absorbing means being of such size relative to said engine that substantially all of the energy derived by the engine from the expanding gas is absorbed by the pump and the energy absorbing means.

2. In combination, a gas expansion engine, a lubricant pump adapted to discharge lubricant at a pressure higher than the pressure of the gas at a selected point in said engine, mechanical means including a shaft exposed to the pressure of the gas at the selected point in said engine and connecting said engine and pump whereby said engine may drive said pump, a housing enclosing said engine and a portion of said shaft and having a portion closely but freely embracing a zone of said shaft, a connection between said pump and a point intermediate the ends of said zone to cause lubricant to flow from said zone toward said engine along said shaft to prevent flow of gas through said zone, a sump in said housing to collect such lubricant, a reservoir exterior of said housing and having its lower and upper end portions connected to the interior of said housing at said sump and at a point spaced above said sump respectively so as to equalize the gas pressures in said sump and in said reservoir, and a connection between the lower end portion of said reservoir to the inlet of said pump.

3. In combination, a gas expansion engine, a lubricant pump adapted to receive and discharge lubricant at pressures both of which are higher than the pressure of the gas at a selected point in said engine, mechanical means including a shaft exposed to the pressure of the gas at the selected point in said engine and connecting said engine and pump whereby said engine may drive said pump, a housing enclosing said engine and a portion of said shaft and having a portion closely but freely embracing a zone of said shaft, a connection between said pump and a point intermediate the ends of said zone to cause lubricant to flow between said portion of said housing and said shaft toward said engine along said shaft to prevent flow of gas through said zone, a sump in said housing to collect such lubricant, a connection between said sump and the inlet of said pump, and an ejector for drawing lubricant through said last mentioned connection into the inlet of said pump.

4. In combination, a gas expansion engine, a lubricant pump adapted to receive and discharge lubricant at pressures both of which are higher than the pressure of the gas at a selected point in said engine, mechanical means including a shaft exposed to the pressure of the gas at the selected point in said engine and connecting said engine and pump whereby said engine may drive said pump, a housing enclosing said engine and a portion of said shaft and having a portion closely but freely embracing a zone of said shaft, a connection between said pump and a point intermediate the ends of said zone to cause lubricant to flow from said zone toward said engine along said shaft to prevent flow of gas through said zone, a sump in said housing to collect such lubricant, a connection between said sump and the inlet of said pump, an additional connection between the output of said pump and the inlet of said pump and having means therein including a restricted passage for extracting energy from lubricant passing therethrough, the pump end of the connection from said sump opening into said restricted passage, whereby an ejector action will be produced for drawing lubricant from said sump into the inlet of said pump.

5. In combination, a gas expansion engine, a lubricant pump adapted to discharge lubricant at a pressure higher than the pressure of the gas at a selected point in said engine, mechanical means including a shaft exposed to the pressure of the gas at the selected point in said engine and connecting said engine and pump whereby said engine may drive said pump, a housing enclosing said engine and a portion of said shaft and having a plurality of portions closely but freely embracing spaced zones of such shaft and providing bearings therefor, connections between said pump and an intermediate point of each of said zones to cause lubricant to flow from the intermediate points of said zones toward each end of each zone along said shaft, lubricant flowing in the zone most remote from said engine preventing escape of the gas from said engine, a sump in said housing to catch all such lubricant flowing from all such zones into the housing, and a connection between said sump and the inlet of said pump.

6. In combination, a gas expansion engine, a lubricant pump adapted to discharge lubricant at a pressure higher than the pressure of the gas at a selected point in said engine, mechanical means including a shaft exposed to the pressure of the gas at the selected point in said engine and connecting said engine and pump whereby said engine may drive said pump, a housing enclosing said engine and a portion of said shaft and having a portion closely but freely embracing a zone of said shaft, a connection between said pump and a point intermediate the ends of said zone to cause lubricant to flow from said zone toward said engine along said shaft to prevent flow of gas through said zone, a sump in said housing to collect such lubricant, a reservoir having a lower end portion lower than the bottom of said sump and an upper portion spaced above said sump, a connection between said sump and a lower end portion of said reservoir and a connection between the interior of said housing above said sump and an upper end portion of said reservoir respectively, a connection between a lower end portion of said reservoir and the intake of said pump, a perforate receptacle in leaking and overflow relation to the upper end of said reservoir and a connection including a restricted passage connecting the output of said pump with said perforate receptacle.

7. In combination, a gas expansion engine, a lubricant pump adapted to discharge lubricant at a pressure higher than the pressure of the gas at a selected point in said engine, mechanical means including a shaft exposed to the pressure of the gas at the selected point in said engine and connecting said engine and pump whereby said engine may drive said pump, a housing enclosing said engine and a portion of said shaft and having a portion closely but freely embracing a zone of said shaft, a connection between said pump and a point intermediate the ends of said zone to cause lubricant to flow from said zone toward said engine along said shaft to prevent flow of gas through said zone, a sump in said housing to collect such lubricant, a reservoir having a lower end portion lower than the bottom of said sump and an upper portion spaced above said sump, a connection between said sump and a lower end portion of said reservoir and a connection between the interior of said housing above said sump and an upper end portion of said reservoir respectively, a connection between a lower end portion of said reservoir and the intake of said pump, and a connection including a restricted passage connecting the outlet of said pump with the upper end of said reservoir, said reservoir including a receptacle adjacent its upper end positioned to receive lubricant flowing from the outlet of said pump through said connection with the restricted passage, said receptacle having a restricted drain opening adjacent its bottom to permit it to empty into the lower portion of the reservoir when operation of the pump ceases, and being open at its upper end into said reservoir to overflow thereinto.

8. In combination, the components which comprise a gas expansion engine, a mechanical energy transferring means connected to said engine to be driven thereby and extending downwardly therefrom, bearings for said transferring means, an absorber for mechanical energy connected to said mechanical energy transferring means remote from and below said engine to receive energy therefrom; all of which components are in fluid communication with each other and sealed by an encasing structure from exposure to a surrounding atmosphere except for the gas inlet and outlet of said engine, and a liquid lubricant filling the lower part of said encasing structure to the extent of completely filling said energy absorber.

9. In combination, the components which comprise a gas expansion engine, a mechanical energy transferring means connected to said engine to be driven thereby and extending downwardly therefrom, bearings for said transferring means, an absorber for mechanical energy connected to said mechanical energy transferring means remote from and below said engine to receive energy therefrom and comprising a liquid pump, a liquid cooler connected to the outlet of said pump to receive liquid therefrom and to the inlet of said pump to return liquid thereto, an ejector associated with said pump and delivering a liquid to the circuit which includes the pump and the cooler, all of which components are in fluid communication with each other and sealed against communication with the outside except for the gas inlet and outlet of said engine, and a liquid lubricant filling the lower part of said encasing structure to the extent of completely filling said energy absorber.

10. In combination, the components which comprise a gas expansion engine, a mechanical energy transferring means connected to said engine to be driven thereby and extending downwardly therefrom, bearings for said transferring means, an absorber for mechanical energy connected to said mechanical energy transferring means remote from and below said engine to receive energy therefrom and comprising a liquid pump, a liquid cooler connected to the outlet of said pump to receive liquid therefrom and to the inlet of said pump to return liquid thereto, an ejector associated with said pump and delivering a liquid to the circuit which includes the pump and the cooler, all of which components are in fluid communication with each other and sealed against communication with the outside except for the gas inlet and outlet of said engine, a liquid lubricant filling the lower part of the closed system thus formed to the extent of completely filling said energy absorber, means connecting said pump to said bearings to supply lubricant thereto under pressure, and means for returning lubricant thereto under pressure, and means for returning lubricant from said bearings to the inlet of said pump.

11. In combination, the components which comprise a gas expansion engine, a mechanical energy transferring means connected to said engine to be driven thereby and extending downwardly therefrom, bearings for said transferring means, an absorber for mechanical energy connected to said mechanical energy transferring means remote from and below said engine to receive energy therefrom and comprising a liquid pump, a connection between the inlet and outlet of said pump and means providing a restricted passage in said connection, all of which components are in fluid communication with each other and sealed against communication with the outside except for the gas inlet and outlet of said engine, a liquid lubricant filling the lower part of said encasing structure to the extent of completely filling said energy absorber, means connecting said pump to said bearings to supply lubricant thereto under pressure, a receptacle adjacent said bearings for collecting lubricant flowing therefrom, and means connecting from said receptacle to said restricted passage and opening into the throat of said restricted passage, whereby the flow of liquid through said restricted passage will provide an ejector action to return liquid from said receptacle to said pump.

12. In combination, an elastic fluid expansion engine, a fluid pump connected to said engine by a mechanical means including a shaft, a common housing around said engine, pump and mechanical means, a bearing seated in said housing in fluid tight relationship therewith and extending to closely but freely embrace said shaft to thereby form a partition in said housing between said engine and pump and having opposite sides thereof respectively exposed to said elastic fluid and the discharge fluid from said pump, said pump being adapted to discharge fluid at a pressure higher than that of the elastic fluid in contact with said bearing whereby the discharge fluid can flow along said shaft towards said engine, means connecting a sump for collecting such fluid and the inlet of said pump and energy absorbing means in fluid communication with the inlet and outlet of said pump, said pump and energy absorbing means being of such size relative to the engine that substantially all of the energy absorbed by said engine in expanding elastic fluid is absorbed by the pump and energy absorbing means.

13. In combination, a gas turbine, a lubricant pump connected to said turbine by a mechanical means including a rotatable shaft, a housing enclosing said turbine and having an extension enclosing a portion of said shaft, a bearing disposed in said extension between said turbine and pump and closely but freely embracing a portion of said shaft and forming a substantially fluid tight seal between the housing and the bearing, said bearing having a passage therethrough opening out onto its inner bearing surface intermediate the ends of said bearing, a connection between the outlet of said pump and said bearing to introduce lubricant into said passage to flow along said shaft toward said turbine, a sump in said housing to catch such lubricant, a reservoir exterior of said housing and having a lower end portion lower than the bottom of said sump and an upper end portion spaced higher than said sump, a connection between said sump and said lower end portion of said reservoir, a connection between the lower end portion of said reservoir and the inlet to said pump, a receptacle connected to overflow into said reservoir and having a restricted drain adjacent its bottom into said reservoir to permit it to empty into said reservoir when operation of the pump ceases, and a connection including a restricted passage between the outlet of said pump and said receptacle.

14. In combination, a gas turbine, a lubricant pump connected to said turbine by a mechanical means including a rotatable shaft, a housing enclosing said turbine and having an extension enclosing a portion of said shaft, a bearing disposed in said extension between said turbine and pump and closely but freely embracing a portion of said shaft and forming a substantially fluid tight seal between the housing and the bearing, said bearing having a passage therethrough opening out onto its inner bearing surface intermediate the ends of said bearing, a connection between the outlet of said pump and said bearing to introduce lubricant into said passage to flow along said shaft toward said turbine, a sump in said housing to catch such lubricant, a reservoir exterior of said housing and having a lower end portion lower than the bottom of said sump and an upper end portion spaced higher than said sump, a connection between said sump and said lower end portion of said reservoir, a connection between the lower end portion of said reservoir and the inlet to said pump, a receptacle connected to overflow into said reservoir and having a restricted drain adjacent its bottom into said reservoir to permit it to empty into said reservoir when operation of the pump ceases, a connection including a restricted passage between the outlet of said pump and said receptacle, and an ejector for drawing lubricant from said reservoir and discharging the same to the inlet of said pump.

15. In combination, an elastic fluid expansion engine, a fluid pump, mechanical means including a shaft connecting said engine to said pump for driving the latter, a closed fluid circulation system connected between the discharge and inlet of said pump, means connected in said system for absorbing energy from the fluid being circulated, said pump and energy absorbing means being of such size relative to said engine that substantially all of the energy removed from said elastic fluid by said engine is absorbed by the pump and said energy absorbing means, a common housing around said engine, pump and mechanical means, partitioning means extending from said housing to provide a portion thereof which closely but freely embraces said shaft at a point intermediate said engine and pump, and means for injecting a sealing fluid between said embracing portion of said partitioning means and the part of said shaft embraced thereby for preventing substantial elastic fluid flow from said engine along said shaft.

16. In combination, an elastic fluid expansion engine operable to remove energy from elastic fluid upon expansion of elastic fluid in the engine, a fluid pump having a discharge and an inlet, a shaft directly connecting the engine to the fluid pump for driving the pump by the energy removed from the elastic fluid, a closed fluid system connected between the discharge and inlet of the pump through which fluid is circulated upon operation of the pump, means for transferring to the fluid being circulated in the closed fluid system the major portion of the energy removed from the elastic fluid, energy absorbing means included in the closed fluid system for absorbing substantially the total energy transferred to the fluid being circulated through the closed fluid system, and means along said shaft providing a sealing fluid therearound for preventing elastic fluid flow from said engine along said shaft.

17. In combination, an elastic fluid expansion engine operable to remove energy from elastic fluid upon expansion of elastic fluid in the engine, a fluid pump having a discharge and an inlet, a shaft directly connecting the engine to the fluid pump for driving the pump by the energy removed from the elastic fluid, a closed fluid system connected between the discharge and inlet of the pump through which fluid is circulated upon operation of the pump, fluid flow restriction means included in the closed fluid system to load the pump and transfer to the fluid being circulated in the closed fluid system a major portion of the energy removed from the elastic fluid, energy absorbing means included in the closed fluid system for absorbing substantially the total energy transferred to the fluid being circulated through the closed fluid system.

References Cited in the file of this patent

UNITED STATES PATENTS

| | | |
|---|---|---|
| 1,337,098 | Standerwick | Apr. 13, 1920 |
| 1,474,086 | Poebing | Nov. 13, 1923 |
| 1,476,781 | Vincent | Dec. 11, 1923 |
| 1,787,088 | Schleyer | Dec. 30, 1930 |
| 2,030,474 | Schmidt | Feb. 11, 1936 |
| 2,124,395 | Caughey | July 19, 1938 |
| 2,159,422 | Buchi | May 23, 1939 |
| 2,608,380 | Rice | Aug. 26, 1952 |